United States Patent [19]
Kuffner et al.

[11] Patent Number: 5,905,372
[45] Date of Patent: May 18, 1999

[54] APPARATUS AND METHOD FOR DELIVERING POWER TO A CONTACTLESS PORTABLE DATA DEVICE

[75] Inventors: Stephen Leigh Kuffner, Algonquin; Scott Nelson Carney, Palatine, both of Ill.; Thomas Glenn Hall, Scottsdale, Ariz.

[73] Assignee: Motorola, Inc., Schaumburg, Ill.

[21] Appl. No.: 08/992,420

[22] Filed: Dec. 17, 1997

[51] Int. Cl.[6] .................................................. H01F 27/42
[52] U.S. Cl. ...................................... 323/356; 340/870.39
[58] Field of Search .................................. 323/356, 909; 340/870.32, 870.39; 455/573

[56] References Cited

U.S. PATENT DOCUMENTS

| | | | |
|---|---|---|---|
| 4,797,541 | 1/1989 | Billings et al. | 363/97 |
| 5,325,046 | 6/1994 | Young et al. | 323/356 |
| 5,396,538 | 3/1995 | Hong | 455/573 |
| 5,455,575 | 10/1995 | Schuermann | 342/42 |
| 5,495,241 | 2/1996 | Donig et al. | 340/870.39 |

*Primary Examiner*—Shawn Riley
*Attorney, Agent, or Firm*—James A. Coffing; Wayne J. Egan

[57] ABSTRACT

A terminal device powers a portable data device by transmitting in two modes of operation. In a first mode of operation, the terminal transmits to the portable data device a power signal at a first level and a data signal using a first modulation format and a first bit rate. In a second mode of operation, the terminal transmits to the portable data terminal a power signal at a second level and a data signal using a second modulation format and a second bit rate. The terminal determines a requirement to change modes of operation, and changes modes in response to changing power requirements of the portable data device.

22 Claims, 2 Drawing Sheets

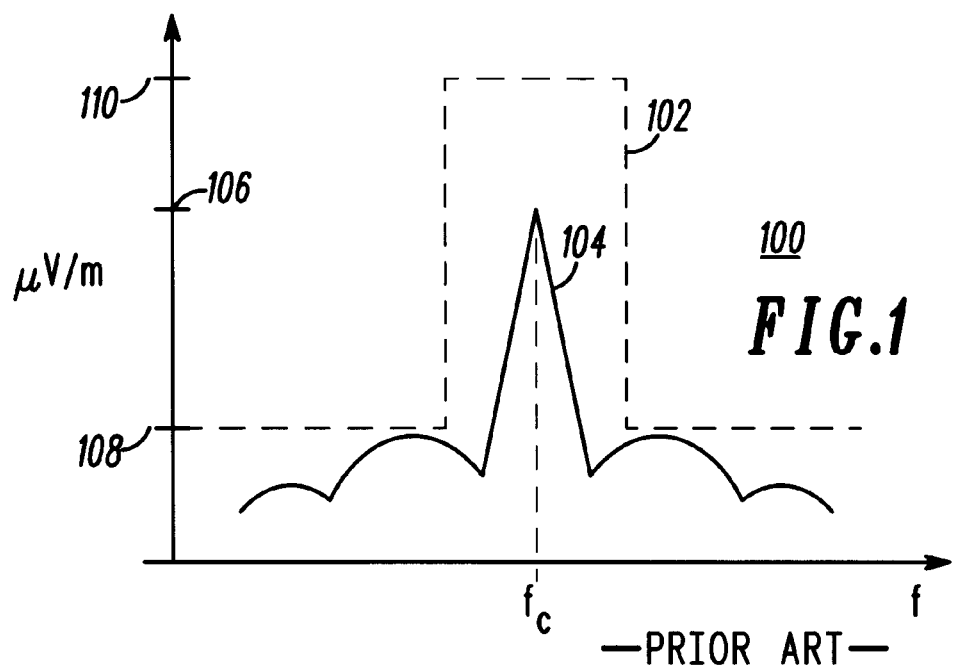
FIG.1 —PRIOR ART—
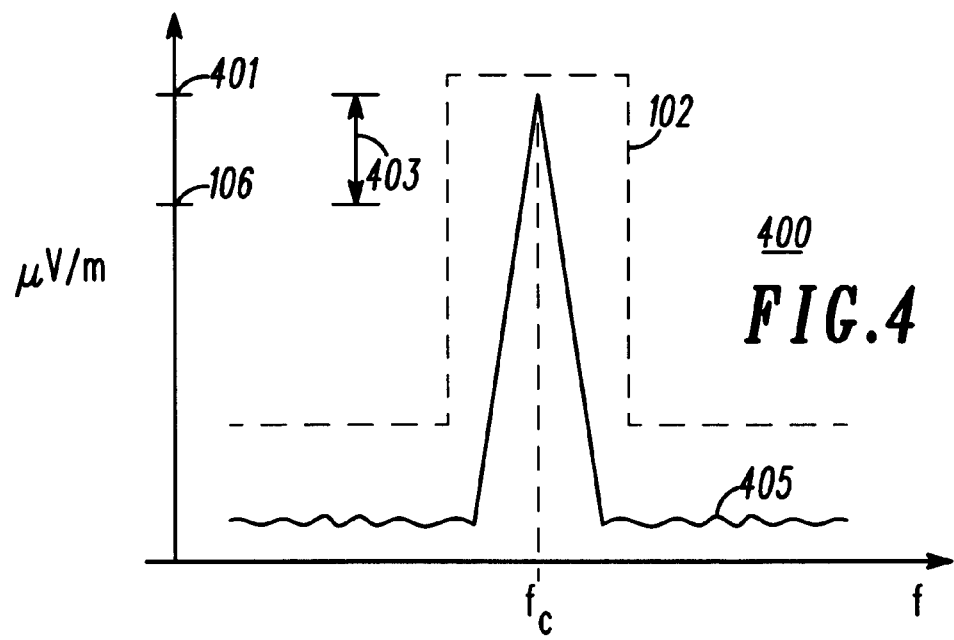
FIG.4

200

300

APPARATUS AND METHOD FOR DELIVERING POWER TO A CONTACTLESS PORTABLE DATA DEVICE

FIELD OF THE INVENTION

The invention relates generally to data transmission systems that include terminals and portable data devices, and in particular to a method of powering a portable data device in such a data transmission system.

BACKGROUND OF THE INVENTION

Data transmission systems are known to include terminal devices (sometimes called readers or exciters) and portable data devices (sometimes called cards or smart cards). It is well understood that today's portable data devices include memory and processor devices that require power from the terminal device. Once such a portable data device (which may be contactless or contacted/contactless—sometimes referred to as combi-cards) enters into the excitation field of the terminal device, power and data can thereafter be transferred from the terminal device to the portable data device. Many factors have an effect on the apparent power seen by the portable data device. In particular, varying proximity to the terminal device and different applications/transactions have an impact on the power being seen and consumed by the data device. These varying power levels cause operational problems in the cards, as later described.

Depending on the card function being exercised at any particular time, the amount of DC current required by the card can vary. For example, if a simple state machine is all that is required for an access control, read-only mode of operation, the card might only draw on the order of 300 $\mu$A at 3 V. If a more complex transaction is initiated, such as an electronic purse debit for a vending machine or a bus token, a microprocessor or microcontroller may need to be activated, and the current draw might go up to 1 mA or higher, depending on the complexity and clock speed of the processor. Such a transaction would also require, at some time, a memory write or erase, and this mode might draw an additional 500–800$\mu$A of current. If a very secure mode is required, such as a high value transaction or a high security building or room access, an encryption or authentication algorithm is commonly employed. Such functions are computationally intensive, and completion in a timely fashion generally requires auxiliary processing power. These auxiliary computational modes could increase the current draw in the card by 5 mA or more, depending on the clock speed and complexity of the implementation.

For a given card—reader separation, the current flowing in the reader antenna has to be above a certain level to provide sufficient power to the card so that, after rectifying the coupled energy, the card's DC current draw requirements are maintained. A competitive advantage is enjoyed by cards that can function at greater distances from the reader. Reader manufacturers generally drive the antenna with as much current as is allowed by local radiated emissions regulations. Larger reader currents also mean larger unintentionally-radiated far-fields, which could interfere with other frequency bands in the vicinity. This is one of the reasons that the 13.56 MHz world-wide Industrial, Scientific and Medical (ISM) band is being considered by contactless card standards bodies, e.g., ISO-14443. This particular region of the spectrum allows large radiated emissions for high power, narrowband applications, as described with reference to FIG. 1.

FIG. 1 shows a spectral diagram 100 that includes a spectral mask 102 depicting the FCC regulatory emission limits for the ISM band. That is, the actual power-frequency response curve 104, which represents the power levels emitted from the terminal, may not exceed the limits shown in mask 102 at the frequencies shown. For example, under FCC part 15, a radiated E-field strength of 10,000 $\mu$V/m measured at 30 m, is the maximum power level 110 allowed within ±7 kHz of 13.56 MHz. Similarly, outside of this narrow band, the radiated E-field must fall below the general limit 108 of 30 $\mu$V/m as measured at 30 m.

To communicate with the card, the reader must impose a modulation on the antenna current. This modulation must be easily detectable at the card so that it can be demodulated with a low-complexity, low-cost, low-current drain card receiver. The value of the modulation index agreed upon in ISO-14443 is ±10% nominal about the mean carrier value for logical 1's or 0's. For random data, this level of modulation for reasonable data rates (105.9375 kbps in ISO-14443) will result in sidebands that are down about 25 dBc peak, 30 dBc average in the International Special Committee on Radio Interference (i.e., CISPR-16) 9 kHz measurement bandwidth. These spectral sidebands will fall outside of the ±7 kHz ISM window, so the largest they can be is 30 $\mu$V/m at 30 m under FCC part 15. That means the largest the modulated carrier could be is 25 dB higher, or 533 $\mu$V/m, even though up to 10,000 $\mu$V/m is allowed for the unmodulated carrier.

For a state-of-the-art microprocessor card (1 mA at 3.3 Vdc), the amount of read range (i.e., maximum separation between terminal and portable data device) achievable with these levels of radiated emissions is only on the order of 10–12 cm. Any higher-current modes required by more sophisticated transactions would only reduce this read range.

Accordingly, there exists a need for a data transmission system that permits an activity-dependent power level to be present at the portable data device. Such a data transmission system that could dynamically provide such an increase in power without exceeding regulatory limits would be an improvement over the prior art.

BRIEF DESCRIPTION OF THE DRAWINGS

FIG. 1 shows a spectral diagram of a power and data signal, as implemented in prior art devices;

FIG. 4 shows a spectral diagram of a power signal, in accordance with a preferred embodiment of the present invention.

DETAILED DESCRIPTION OF A PREFERRED EMBODIMENT

The present invention encompasses a data transmission system that includes a data transmission terminal and a portable data device. According to the invention, the terminal device is capable of transmitting to the card in either a first mode of operation or a second mode of operation. In the first mode, a power signal and a data signal are transmitted to the card, where energy is extracted from the power signal to power the card circuitry, which in turn processes the data bits extracted from the modulated data signal. In the second mode of operation, a power signal is transmitted along with a modified data signal, or in a preferred embodiment, no data signal at all. The terminal device determines the level of the power signal in response to the requirement from the portable data device, and changes between the first and second modes of operation in response thereto.

Figure 2:
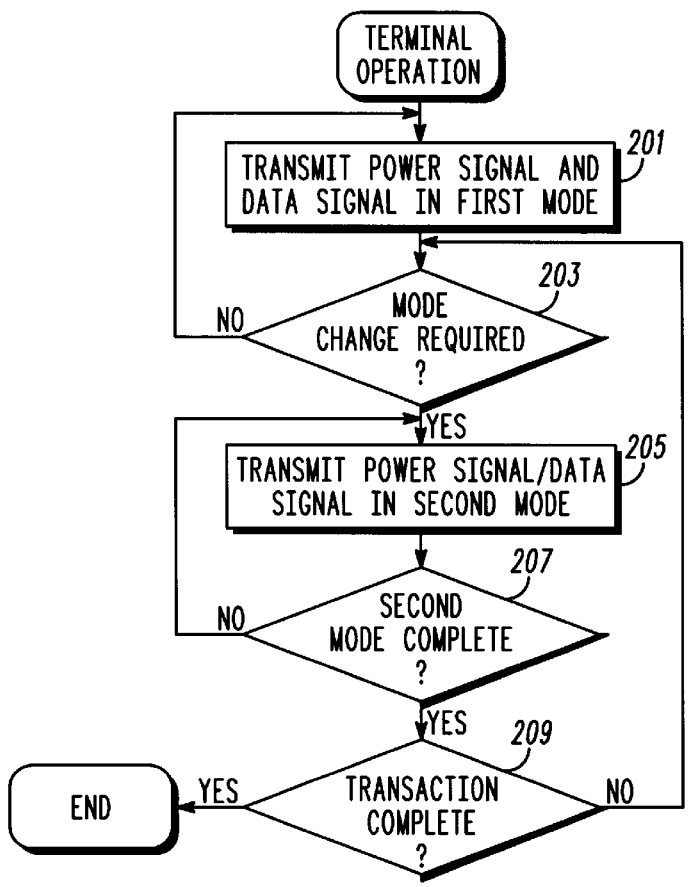
FIG. 2 shows a flow diagram depicting the operation of a terminal device, in accordance with the present invention.

FIG. 2 shows a flow diagram depicting operation of a terminal device, in accordance with the present invention. In a first mode of operation a power signal is transmitted (201) in combination with a data signal modulated in a predetermined fashion, as later described. It should be noted that, in this mode of operation, the power and modulated data signal would appear principally as shown in the spectral diagram of FIG. 1. As is known, the portable data device processes the data signal being received using power extracted from the power signal transmitted by the terminal device. The terminal and card continue to operate in this manner while determining (203) whether a power change is required at the card, indicating a need for changing modes of operation. If no mode change is required, operation continues as before. However, if the power requirements for the portable data device change (e.g., as a result of a power intensive application), the terminal device increases the power signal while reducing the data modulation (205), as described in greater detail below.

Numerous modulation indices and formats are possible for the first mode reader-to-card link, and choice of the modulation would depend on the desired length of transaction time (data rate), desired card receiver complexity (cost, current draw), and desired read range (carrier level allowed while satisfying radiated emissions general limit with sidebands). For example, a very low data-rate system (a few hundred bits/second to a few thousand bits/second with appropriate pulse shaping) could fit the modulation sidebands within the ±7 kHz ISM spectral mask, allowing very high signal strength and long range operation. However, for more complex transactions, such low data rates would result in very long transaction times, perhaps exceeding 10 seconds.

For quick transactions, desirable for vending machine, building access, or transit, bit rates on the order of 100 kbps are required. For a card capable of complex transactions like secured access and multi-purse electronic cash, a processor is required, and the power level needed to support a processor demands a low modulation level in conjunction with the high data rate to achieve reasonable card ranges. For ISO-14443, a modulation index of 10±2% for ASK modulation for simple detection has been agreed upon. It should be noted here that low-deviation FSK or low index PSK would also deliver low sidebands, but at the cost of a more complex card receiver (not a simple envelope detector). A less complex transaction like building-access requires less current draw at the card, and can therefore be supported by a system that radiates lower power while providing larger sidebands, such as the 100% ASK modulation agreed upon for the second branch of ISO-14443. This modulation allows a simpler receiver at the card, but a power signal that must be reduced, due to its larger sidebands, by approximately 10 dB with respect to the 10% ASK modulated system. For cards that draw equal power, the 10% modulation allows approximately a two-times greater read range than the 100% modulation due to the greater sideband level and hence lower allowed carrier level of the 100% modulation.

For a card capable of performing complex functions, different levels of DC current are required, as has already been discussed. For the card to maintain the same range under these different modes, it will require greater reader antenna current. These would correspond to the second modes of operation, such as the EEPROM write/erase or the authentication hardware accelerator or co-processor. This can be done in at least two ways. First, the reader, knowing what kind of transaction it is engaged in, knows when the card has to write data into memory or start its authentication hardware accelerator, and the reader can step up its power by a predetermined amount and for a predetermined duration when it reaches the appropriate point in the transaction. Alternatively, the card, with a processor, determines that it will need more power for its next mode of operation, and requests a power increase of a certain level for a certain amount of time from the reader so that the next mode may be initiated.

The terminal maintains the second mode of operation (207) until the second mode finishes. The completion of this second mode can be determined in at least two ways. First, the terminal, with knowledge of the transaction, knows the predetermined duration of the need for increased power, or second, the card notifies the terminal of completion of second mode operation. If the transaction is not complete (209), the terminal continues to monitor for mode change requirements (203).

During higher current modes of operation, for the same spectral mask to be satisfied, either or both of the following must happen. First, the data rate must be greatly reduced or increased, or second, the modulation index must be reduced, or some combination of both. The fact that altering the data rate satisfies the requirements can be shown by simple numerical integrations using any one of numerous mathematical packages, and integrating over a CISPR-16 9 kHz-bandwidth centered at 7 kHz offset. For example, assume a first mode data rate of 105.9375 kbps, and that the sideband spectra obeys the following distribution:

$$S(f) = A^2 T_b \frac{\sin^2(\pi f / R_b)}{(\pi f / R_b)^2}$$

where A is the absolute modulation level, $R_b$ is the bit rate, $T_b$ is the reciprocal of the bit rate, and f is the offset frequency from the carrier. Decreasing the data rate increases $T_b$, which makes the low-frequency modulation components increase, but also narrows the main lobe so that overall less energy falls within the measurement filter centered at 7 kHz offset. Alternatively, if the data rate is increased above 105.9375 kbps, $T_b$ gets smaller, and since the sin(x)/x is now approximately equal to 1 over the measurement filter bandwidth for the very high data rate, the integrated power again goes down. If the second mode requires a carrier power increase of 5 dB, so that the absolute modulation level 'A' increases also by 5 dB, the data rate would have to be reduced to <1.6 kbps so that the main lobe of the spectrum is narrowed enough to satisfy the ±7 kHz spectral mask. For data rate increase, the data rate would need to be increased above about 340 kbps. Either data rate would reduce the integrated out-of-band power by 5 dB and satisfy the regulations.

Reducing the modulation index will also reduce the integrated power level. For example, if the carrier increased by 5 dB and the absolute modulation level 'A' remained the same (so that the modulation index is reduced), the sideband levels stay the same. For example, if the second mode required a carrier power increase of 5 dB, the modulation index would have to drop from about 10% down to about 5%.

For some applications, no data needs to be exchanged during the higher current modes. In the preferred embodiment, there is no modulation during the EEPROM write/erase or while the hardware accelerator or math co-processor are running, since nothing more can be communicated until the portable data device has completed an operation and is awaiting execution of the next steps in the data exchange protocol. In this context, no modulation can be considered a special case of lower data rate or lower modulation index.

A typical transaction might proceed as follows: The card enters the field of the reader, which is transmitting queries in the first mode modulation format and power level. The card powers up when it gets close enough, initially utilizing the first mode modulation and power level. At this time the card can communicate back to the reader its power requirement request.

Eventually the card needs to change modes, perhaps for an EEPROM write or a reader authentication. At this time, the card could notify the reader that it is ready for a power step of a certain size and for a certain duration. The reader acknowledges this request and increases the power. However, since there is little or no communication required during this second mode, the reader turns off all modulation or modifies the bit rate and modulation index to reduce out-of-band emissions such that an increased carrier power level is achievable, and transmits at the higher power level for the required amount of time. Once this time has elapsed, the reader reduces the power level back to the first mode level, and resumes communications with the card. In the foregoing manner, the terminal is able to deliver the power required by the card without emitting levels in excess of the FCC spectral mask (102 shown in FIG. 1).

Figure 3:
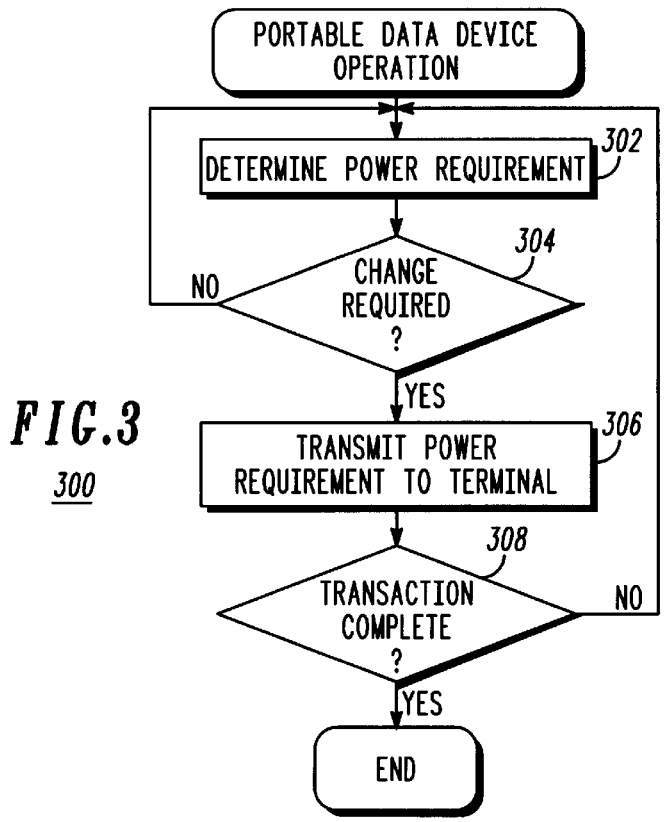
FIG. 3 shows a flow diagram depicting the operation of a portable data device, in accordance with the present invention.

FIG. 3 shows a flow diagram depicting operation of the portable data device, in accordance with the present invention. Upon entering the excitation field of the terminal device, the single-application portable data device determines (302) its power requirements for an upcoming transaction sequence. A multi-application portable data device similarly determines the power required for the upcoming transaction sequence that corresponds to the application supported by the terminal device. That is, depending upon the application that the terminal device is running, the card is able to determine its own power requirements. It should be noted that the present invention assumes an ability, at the card, to determine both desired power levels and present operating power levels as seen by the regulator/rectifier circuit. As with the terminal device, this mode continues until a power change requirement is detected (304). Upon detection of a power change requirement, the portable data device transmits (306) back to the terminal device its new power requirement for the pending application.

According to the invention, the card determines what power request to send back to the reader through several means. First, by observing the status of its regulator, the card might calculate that it needs less power than is being provided and, based on design analysis, request the reader to lower its power by a suggested amount. Second, the card, knowing that it will be engaging a high current-draw function such as a math co-processor, notifies the reader that there isn't sufficient power to engage this function and, based on design analysis, it might request that the power be increased by a suggested amount. The reader increases the power to the requested level while modifying the modulation and/or data rate to reduce the spectrum as described during operation in the second mode.

Further, when the transaction follows a fixed standard pattern each time it is initiated, the card can communicate the power requirements, either as a function of task or as a function of time, to the terminal device for subsequent sequential execution. The terminal device retains this power profile information and, when a first mode is completed, moves to a second mode for a specified time. Upon completion of the second mode, the terminal device adjusts its power level, modulation index and/or data rate to operate in the next requested mode, until the completion of the power-time sequence. Allowances are made for departures from this original power-time profile if protocol execution requires repetition of a power-requiring task or tasks.

A power-time profile could also be stored within the card, and communicated to the reader at the beginning of the transaction. This power-time profile may also be known a-priori by both reader and card. In such a case, the specific details of the power-time profile need not be directly communicated during the transaction; a power-time profile may be defined by a unique identifier that is communicated to the reader. Referring again to FIG. 3, the card continues to determine (302) its power requirements, until the transaction is finished (308).

FIG. 4 shows a spectral diagram 400 of an increased power signal transmitted from the terminal (i.e., second mode of operation), in accordance with the invention. As shown, the maximum power level 401 exceeds the maximum power level generated in the first mode of operation (i.e., power level 106) by an amount 403, while still complying with the FCC limit, as indicated by spectral mask 102. Also, without data modulation (or with substantially zero modulation), the sideband power curve 405 is well below the spectral mask 102. In this manner, the present invention allows for the card to receive greater power from the terminal without exceeding the regulatory emission limits.

The invention described above allows cards with multiple modes or functions to complete a complex transaction at the maximum range capability of the reader (terminal) while still satisfying radiated emission spectral regulations. Unlike previous implementations of this type of product, it changes the power level as needed for more complex and high-power functions, while it also adjusts the data rate and/or modulation index for different power levels in order to maintain a compliant sideband level. In addition, the card constantly observes its regulator to determine if a power change in the reader is necessary.

What is claimed is:

1. In a terminal device, a method of powering a portable data device comprising the steps of:

transmitting to the portable data device, in a first mode of operation, a power signal at a first power level and a data signal using a first modulation format and a first bit rate;

transmitting to the portable data device, in a second mode of operation, a power signal at a second power level and a data signal using a second modulation format and a second bit rate;

determining a power requirement from the portable data device to change modes of operation from the first mode of operation to the second mode of operation; and changing, responsive to the step of determining, between the first mode of operation and the second mode of operation, where the second power level does not equal the first power level.

2. The method of claim 1, wherein the step of determining comprises the step of receiving, from the portable data device, a request to change modes of operation.

3. The method of claim 1, wherein the step of determining comprises the steps of:

retrieving a stored power-time profile; and interpreting the power-time profile to determine whether a mode change is presently required.

4. In a terminal device, a method of powering a portable data device comprising the steps of:
 transmitting to the portable data device, in a first mode of operation, a power signal at a first level and a data signal using a first modulation format and a first bit rate;
 transmitting to the portable data device, in a second mode of operation, a power signal at a second level and a data signal using a second modulation format and a second bit rate;
 determining a requirement to change modes of operation; and
 changing, responsive to the step of determining, between the first mode of operation and the second mode of operation, wherein the first modulation format comprises ASK modulation using a modulation index in the range of 8%–12%.

5. In a terminal device, a method of powering a portable data device comprising the steps of:
 transmitting to the portable data device, in a first mode of operation, a power signal at a first level and a data signal using a first modulation format and a first bit rate;
 transmitting to the portable data device, in a second mode of operation, a power signal at a second level and a data signal using a second modulation format and a second bit rate;
 determining a requirement to change modes of operation; and
 changing, responsive to the step of determining, between the first mode of operation and the second mode of operation, wherein the first modulation format comprises ASK modulation using a 100% modulation index.

6. The method of claim 1, wherein the second modulation format comprises a modulation index that is lower than that of the first modulation format.

7. The method of claim 6, wherein the second modulation format comprises a modulation index of substantially zero.

8. The method of claim 7, wherein the second bit rate is substantially zero.

9. The method of claim 1, wherein the second bit rate is different from the first bit rate.

10. The method of claim 9, wherein the second bit rate is substantially zero.

11. The method of claim 9, wherein the second modulation format comprises a different modulation index than the first modulation format.

12. In a portable data device that is in communication with a terminal device, a method of performing one of a plurality of power-requiring tasks, comprising the steps of:
 determining by the portable data device a power requirement of the portable data device for a first of the plurality of power-requiring tasks; and
 transmitting by the portable data device to the terminal device, responsive to the step of determining, a power requirement request to change between a first mode of operation at a first power level and a second mode of operation at a second power level, where the second power level does not equal the first power level.

13. The method of claim 12, wherein the step of determining comprises the step of identifying a power-time profile that characterizes the power requirement to perform the plurality of power-requiring tasks.

14. The method of claim 12, wherein the step of transmitting comprises the step of directing the terminal device to deliver a power signal that corresponds to the power requirement.

15. The method of claim 12, wherein the step of determining comprises the step of calculating a relative difference value between a present power level on the portable data device and a desired power level.

16. The method of claim 15, wherein the step of transmitting comprises the step of sending the relative difference value to the terminal device.

17. In a data transmission terminal, a method of powering a contactless portable data device comprising the steps of:
 transmitting to the portable data device, in a first mode of operation, a power signal at a first power level and a data signal using a first modulation format;
 receiving a power requirement request from the portable data device for the data transmission terminal to change the transmitted power level by a specified amount; and
 transmitting to the portable data device, responsive to the step of receiving, a power signal at a second power level, wherein the second power level differs from the first power level by the specified amount.

18. In a data transmission terminal, a method of powering a contactless portable data device comprising the steps of:
 transmitting to the portable data device, in a first mode of operation, a power signal at a first level and a data signal using a first modulation format;
 receiving a request from the portable data device to change the transmitted power level by a specified amount; and
 transmitting to the portable data device, responsive to the step of receiving, a power signal at a second level, wherein the second level is different from the first level by the specified amount, wherein the first modulation format comprises ASK modulation using a modulation index in the range of 8%–12%.

19. In a data transmission terminal, a method of powering a contactless portable data device comprising the steps of:
 transmitting to the portable data device, in a first mode of operation, a power signal at a first level and a data signal using a first modulation format;
 receiving a request from the portable data device to change the transmitted power level by a specified amount; and
 transmitting to the portable data device, responsive to the step of receiving, a power signal at a second level, wherein the second level is different from the first level by the specified amount, wherein the first modulation format comprises ASK modulation using a 100% modulation index.

20. The method of claim 17, wherein the first modulation format comprises a first modulation index and a first bit rate, wherein the second modulation format comprises a second modulation index and a second bit rate, and wherein the first modulation index is different from the second modulation index.

21. The method of claim 20, wherein the first bit rate is different from the second bit rate.

22. The method of claim 17, wherein the first modulation format comprises a first modulation index and a first bit rate, wherein the second modulation format comprises a second modulation index and a second bit rate, and wherein the first bit rate is different from the second bit rate.

* * * * *